United States Patent [19]
Yanagisawa et al.

[11] Patent Number: 5,455,817
[45] Date of Patent: Oct. 3, 1995

[54] SECOND HARMONICS GENERATING OPTICAL RECORDING LAYER

[75] Inventors: Takuma Yanagisawa; Seiichi Ohsawa, both of Tsurugashima, Japan

[73] Assignee: Pioneer Electronic Corporation, Tokyo, Japan

[21] Appl. No.: 106,698

[22] Filed: Aug. 16, 1993

[30] Foreign Application Priority Data

Aug. 28, 1992 [JP] Japan ................................ 4-230335

[51] Int. Cl.$^6$ ........................................... G11B 7/26
[52] U.S. Cl. ................... 369/275.5; 369/288; 369/112
[58] Field of Search ........................ 369/112, 275.1, 369/275.5, 288, 100; 359/247; 430/945, 495, 21; 428/333

[56] References Cited

U.S. PATENT DOCUMENTS

| | | | |
|---|---|---|---|
| 4,946,261 | 8/1990 | Yaegashi et al. | 430/21 |
| 4,971,426 | 11/1990 | Schildkraut et al. | 359/247 |
| 5,204,178 | 4/1993 | Licht et al. | 428/333 |

OTHER PUBLICATIONS

Japan Applied Physics Society, Optical Integral Circuit, Bases and Application, 1988.
Yariv, Introduction to optical Electronics, 3rd Edition pp. 250–271, 1985.

*Primary Examiner*—Scott J. Sugarman
*Assistant Examiner*—Kim-Kwok Chu
*Attorney, Agent, or Firm*—Fish & Richardson

[57] ABSTRACT

A reflective film is formed over a recording surface of an optical disk on which pits are formed. The reflective film is made of a non-linear optical material which, when light is incident thereon, generates second harmonics of the incident light. In a reproduction optical system for reproducing this optical disk, when a reading beam reflected by the reflective film of the optical disk impinges on a filter for filtering out the basic wave of the reading beam, the filter only transmits the second harmonics which are then incident on a light receiver. Since information signals recorded on an optical disk is reproduced by reading only second harmonics of the reflected beam, the cut-off spatial frequency of the OTF can be made twice higher as compared with a conventional reproducing apparatus. In other words, the recording density of the recording medium can be made higher.

13 Claims, 3 Drawing Sheets

SECOND HARMONICS GENERATING OPTICAL RECORDING LAYER

BACKGROUND OF THE INVENTION

Field of the Invention

This invention relates to an optical information reading system.

Description of the Related Art

In an optical information reading system such as an optical disk player, for example, the cut-off spatial frequency of a reproduction optical system is generally restricted to 2NA/λ, where NA represents the aperture number of an objective lens and λ the wavelength of a laser. For this reason, information signal comprising higher spatial frequency components than 2NA/1 cannot be reproduced, so that the recording, density of an optical disk is limited by the cut-off spatial frequency.

For extending the cut-off spatial frequency toward the higher frequency side, an optical disk has been proposed to have a reflective layer therewith unitizing a material, the reflectivity of which depends on the intensity of an incident light. The optical transfer function (OTF) for reproducing such an optical disk is substantially the sum of the OTF of a conventional reproduction optical system and additional OTF by a change in the reflectivity in beam spots of the optical disk. Therefore, unless the change in the reflectivity of the reflective layer is large, high frequency components cannot be reproduced since the absolute value of the OTF on the high frequency side becomes extremely small.

SUMMARY OF THE INVENTION

The present invention has been made in view of the problem stated above, and its main object is to provide an optical information reading system which is capable of reproducing spatial frequency components on the high frequency side.

It is another object of the present invention to provide an optical information reading system which is capable of improving the recording density of a recording medium from which information is to be read.

According to the present invention, there is provided an optical information reading system which comprises a reflection-type recording medium; and a reproducing unit for reading information signals from the reflection-type recording medium, wherein the reflection-type recording medium has a reflective film made of a material which causes harmonics to be generated with a reading beam serving as the basic wave thereof, and the reproducing unit includes light receiving means for receiving the harmonics.

In the optical information reading system of the present invention, when a reading beam irradiated to the reflection-type recording medium is reflected by the reflective film of the recording medium, harmonics are generated with the reading beam serving as the basic wave and received by the light receiving means. The OTF of the light receiving means receiving the harmonics is such that the cut-off spatial frequency is extended toward the high frequency side, as compared with the OTF of a light receiving means which receives the basic wave of the reading beam reflected by the recording medium, so that the recording density of the recording medium can be increased.

According to the optical information reading apparatus, since the second harmonics of the reading beam reflected by a recording medium is read to reproduce information signals recorded on the recording medium, the cut-off frequency of the reproducing unit can be made twice higher than conventional reproducing apparatus. It is therefore possible to record information signals on a recording medium at a higher density.

DETAILED DESCRIPTION OF THE PREFERRED EMBODIMENTS

The optical information reading system of the present invention will hereinafter be described in connection with an embodiment where the present invention is applied to an optical disk player with reference to the accompanying drawings.

Figure 1:
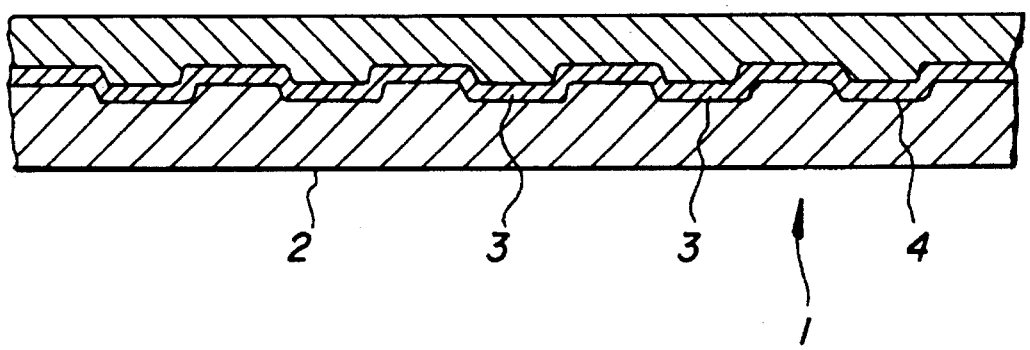
FIG. 1 is a vertical sectional view showing one embodiment of an optical disk according to the present invention.
Figure 2:
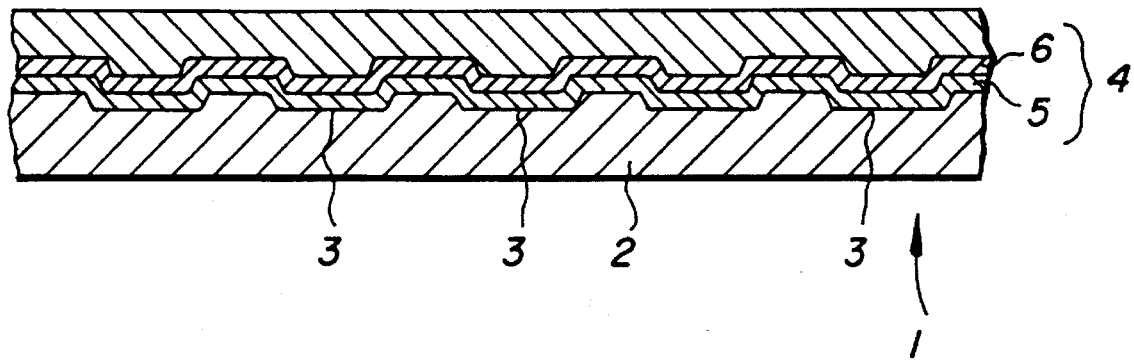
FIG. 2 is a vertical sectional view showing second embodiment of an optical disk having a different structure from that of FIG. 1.

Referring first to FIG. 1, a reflection-type optical disk 1 is a reflection-type recording medium, the optical disk 1 has a transparent substrate 2 on which a plurality of pits 3 are formed corresponding to information signals as tracks. Over the pits 3, there is formed a reflective film 4. The reflective film 4 is made of a non-linear optical material which generates harmonics such as second harmonics in proportion to the intensity of incident light. An example of the non-linear material is an LB film made from an organic second non-linear optical material such as a pyrazine derivative or an azobenzene derivative, or an organic third non-linear optical material such as phthalicyanin derivative or a naphthalincyanin derivative. Apart from this structure, as shown in FIG. 2, the reflective film 4 in the alternative may be constituted of a transparent film 5 made of a non-linear optical material so as to generate harmonics such as second harmonics (SHG) and deposited on the substrate on which pits are formed, and a laminated film 6 made of a known material, for example, aluminum (Al) or the like on the film 5.

Figure 3:
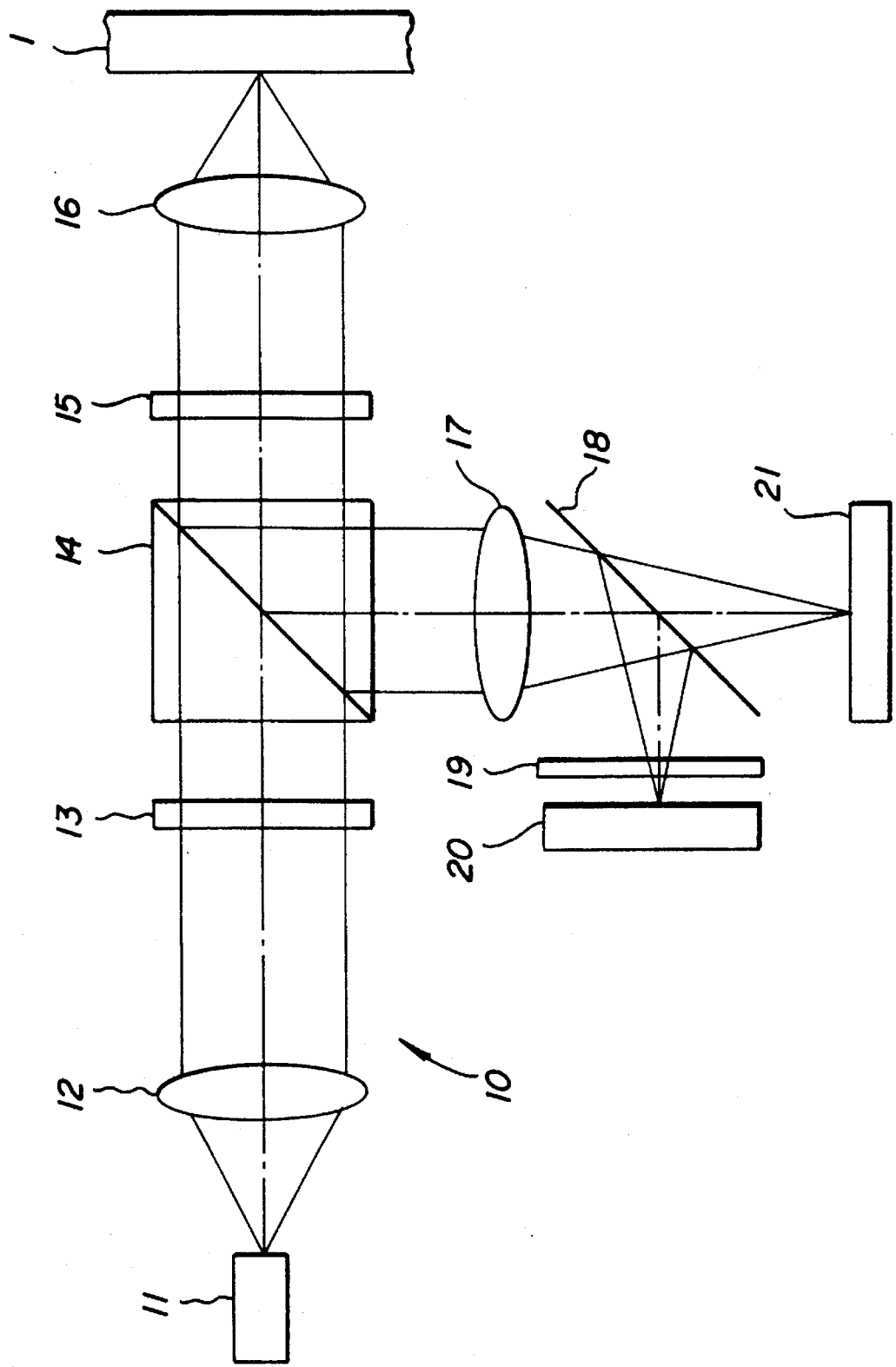
FIG. 3 is a schematic diagram-showing the structure of a reproduction optical system according to the present invention.

Referring next to FIG. 3, a reproducing apparatus for reading the optical disk 1 includes a reproduction optical system 10 as shown in the drawing. This reproduction optical system 10 is provided to irradiate the optical disk 1 with a reading beam from a semiconductor laser, and comprises a collimator lens 12, a grating 13, a polarization beam splitter 14, a quarter wavelength plate 15 having less wavelength dependency, and an objective lens 16 in this order on an optical path passing from the semiconductor laser 11 through the optical disk 1 from the side of the laser 11. Then, for receiving the reading beam reflected by the optical disk 1, a lens 17 and a beam splitter 18 are disposed on an optical path branched from the polarization beam splitter 14. Also, on an optical path bent by the beam splitter 18, a filter 19 and a light receiver 20 for RF signals are disposed in this order from the side of the beam splitter 18. Further, a light receiver 21 for servo is disposed on an optical path which straightly passes through the beam splitter 18.

The semiconductor laser 11 emits a beam at wavelength $\lambda_1$. The filter 19 filters out the beam at wavelength $\lambda_1$ and transmits harmonics of the laser beam such as second harmonics $\lambda_2$ ($\lambda_2=\lambda_1/2$) and third harmonics $\lambda_3$ ($\lambda_3=\lambda_1/3$).

Next, the operation of the reproduction optical system according to this embodiment will be explained.

A reading beam emitted from the semiconductor laser 11 is directed to the optical disk 1 through the collimator lens 12, the grating 13, the polarization beam splitter 14, the quarter wavelength plate 15, and the objective lens 16 in this order and reflected by the reflective film 4 of the optical disk 1. In this event, second harmonics, excited by the reading beam irradiated on the reflective film 4, are generated thereon. The second harmonics pass through the objective lens 16 and the quarter wavelength plate 15, and has its optical path bent by the polarization beam splitter 14. The optical path of the second harmonics is again bent by the beam splitter 18 so that the second harmonics are directed to be incident on the filter 19. This filter 19 filters out the basic wave of the reading beam at wavelength $\lambda_1$ and transmits the second harmonics at wavelength $\lambda_2$. Therefore, the light receiver 20 for RF signals receives only the second harmonics of the reading beam, which are transduced to an electric signal. In response to this electric signal, information signals recorded on the optical disk 1 are reproduced in a circuit on the next stage (not shown).

The beam passing through the beam splitter 18 is received by the light receiver 21 for servo and used to generate control signals based on which tracking servo control and focus servo control are performed for an optical pickup including the objective lens 16.

Next, the OTF of this reproducing apparatus will be examined.

Figure 4:
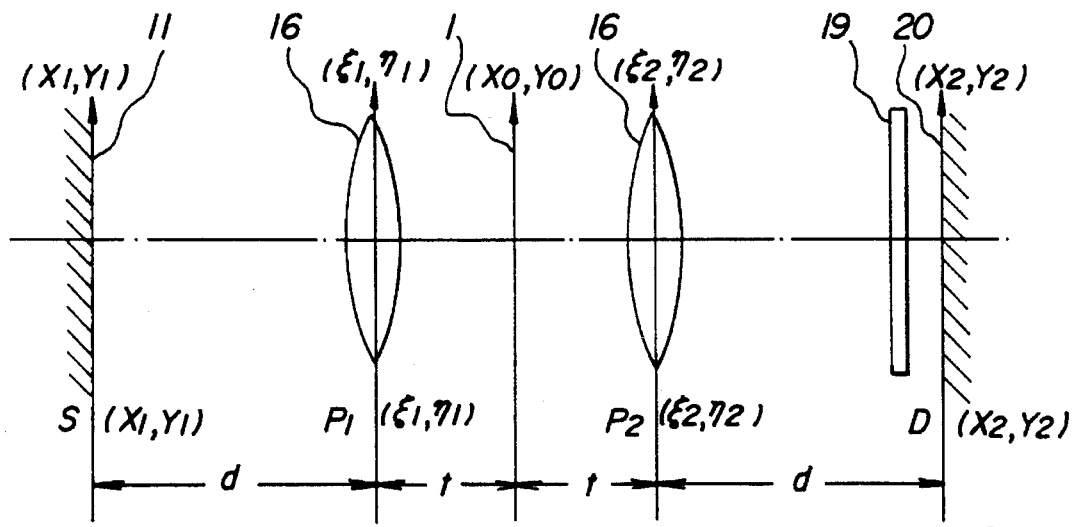
FIG. 4 is a diagram for explaining the coordinate system of the reproduction optical system of FIG. 3.
Figure 5:
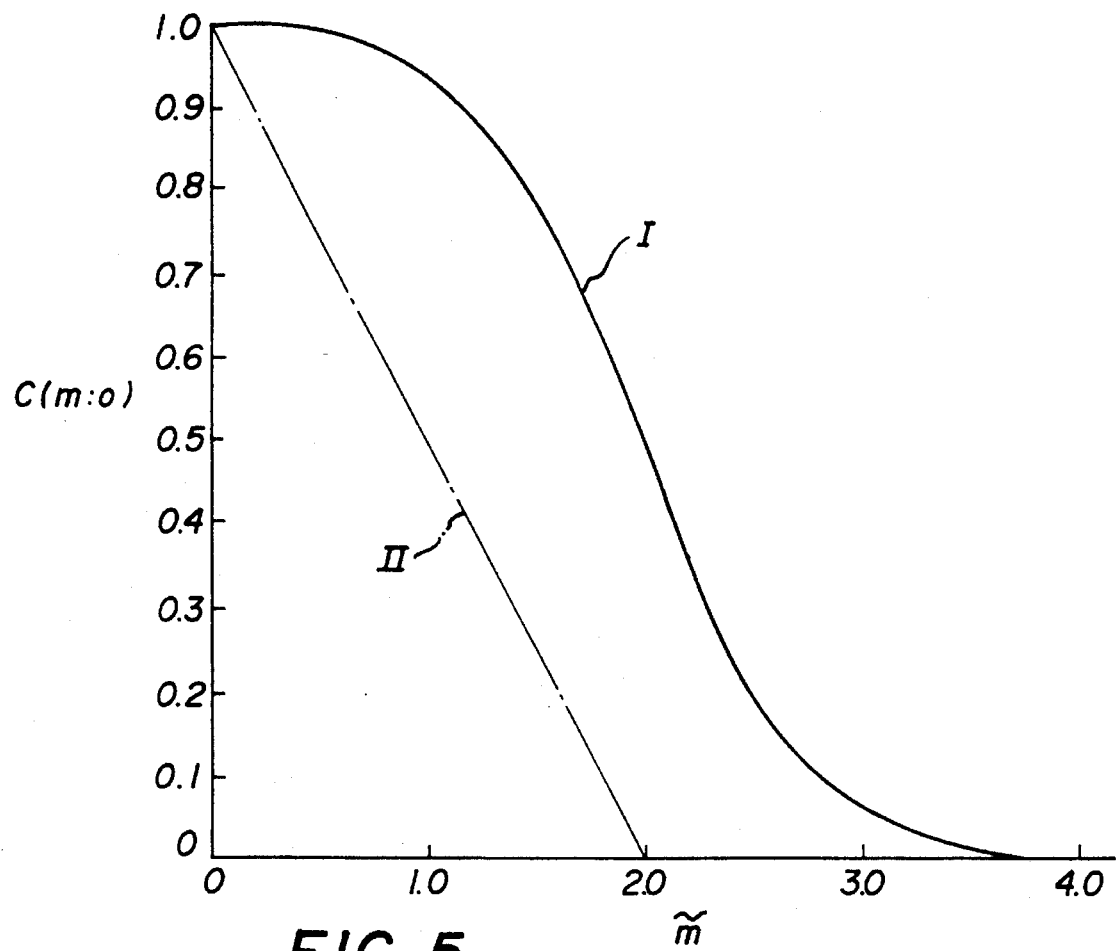
FIG. 5 is a graph showing the OTF of the reproduction optical system of FIG. 3.

Assuming that the reproduction optical system 10 is divided into an incident optical system whereby the reading beam impinges on the optical disk 1 and a light receiving optical system whereby the reading beam reflected by the optical disk 1 passes through to be received by the servo light receiver 21, and the coordinate system is defined as shown in FIG. 4. Specifically, in this coordinate system, S ($x_1$, $y_1$) indicates the position of the laser 11; $P_1(\xi_1, \eta_1)$ is a pupil function of the objective lens 16 when the reading beam is incident thereon; ($x_0$, $Y_0$) represents the reflecting surface of the optical disk 1; $P_2(\xi_2,\eta_2)$ is a pupil function of the objective lens 16 when the reflected beam is incident thereon; and ($x_2$, $y_2$) represents the light receiving surface of the light receiver 20 for RF signals. Assuming that the pupil functions of the objective lens 16, $P_1(\xi_1,\eta_1)$ and $P_2(\xi_2,\eta_2)$ respectively define a circular opening, and spatial frequency components in the track direction on the optical disk 1 is represented by (m, p), the OTF may be expressed by the following equation:

$$c(m;p) = \int_{-\infty}^{+\infty}\int_{-\infty}^{+\infty} \left| P_2\left(\frac{X}{2},\frac{Y}{2}\right) \right|^2 G_1(\lambda_1 fm - x,y) G_1^*(\lambda_1 fp - x,y) dx dy \quad (1)$$

$$G_1(x,y) = P_1(x,y) \circledast P_1(x,y)$$

where $\hat{x}$ represents a convolution integral, and $\lambda_1 fm - \xi_2 \equiv x$ $\lambda_1 fp - \xi_2 \equiv x$ $\eta_2 \equiv y$ Considering the OTF in one direction (m;O) based on the equation (1), the OTF has been obtained as a curve I shown in FIG. 5. Incidentally, a broken line II represents the OTF when the basic wave of the reading beam reflected by the optical disk 1 is solely reproduced as a RF signal. In this case, however, the abscissa of the graph represents a normalized spatial frequency defined by the following equation (2):

$$\bar{m}=m\lambda_1 f/b_1 \quad (2)$$

where $2b_1$ is the aperture diameter of the objective lens.

It can be understood from FIG. 5 that the cut-off spatial frequency of the reproduction optical system 10 is twice higher as compared with the conventional optical system. As a result, the recording density of the optical disk 1 can be made higher. Also, since a certain large value is maintained for the absolute value of the OTF on the high frequency side, higher frequency signals can be reproduced without being covered with noise.

While in the present embodiment, the optical disk 1 is reproduced using second harmonics of the reflected reading beam from the optical disk 1, the reproduction is not limitatively performed by the use of second harmonics, but third harmonics may also be used for this purpose. With the third harmonics, similar effects can also be obtained.

Further, if a dichroic mirror is employed instead of the beam splitter 18, the filter 19 may be removed.

It should be understood that those skilled in the art can obtain any applications and modifications within the claims of the present invention. The present invention is not limited to the embodiments disclosed above but is limited by only the scope of the appended claims of the present invention.

What is claimed is:

1. An optical information reproducing system comprising:
   a reflection-type recording medium; and
   a reproducing unit for reading information signals reflected from said reflection-type recording medium,
   wherein said reflection-type recording medium comprises a reflective film made of a material which generates harmonic frequencies of a reading light beam wherein said harmonic frequencies have a frequency n (where n is an integer greater than 1) times the frequency of said reading light beam, and said reproducing unit comprising light receiving means for receiving said harmonic frequencies.

2. An optical information reproducing system according to claim 1, wherein said reflective film generates at least second harmonics.

3. An optical information reproducing system according to claim 2, wherein said reproducing unit receives said second harmonics generated by said reflective film.

4. An optical information reproducing system according to claim 1, wherein said reproducing unit comprises interrupting means for avoiding said reading light beam reflected by said reflective film from being received by said light receiving means.

5. An optical information reproducing system according to claim 4, wherein said interrupting means is a filter which does not transmit said reading light beam reflected by said reflective film.

6. An optical information reproducing system comprising:
   a reflection-type recording medium; and
   a reproducing unit for reading information signals reflected from said reflection-type recording medium, wherein said reflection-type recording medium comprises a composite film comprising a thin film made of a material which generates harmonic frequencies of a reading light beam wherein said harmonic frequencies have a frequency n (where n is an integer greater than 1) times the frequency of said reading light beam, and a reflective film for reflecting said harmonic frequencies generated by said thin film, and said reproducing unit comprises light receiving means for receiving said harmonic frequencies.

7. An optical information reproducing system according to claim 6, wherein said reproducing unit receives said harmonics reflected by said reflective film.

8. An optical information reproducing system according to claim 6, wherein said thin film generates second harmonics.

9. An optical information reproducing system according to claim 8, wherein said reproducing unit receives said second harmonics emitted from said composite film.

10. An optical information reproducing system according to claim 6, wherein said reproducing unit comprises interrupting means for avoiding said reading light beam reflected by said reflective thin film from being received by said light receiving means.

11. An optical information reproducing system according to claim 10, wherein said interrupting means is a filter which does not transmit said reading light beam reflected by said reflective film.

12. An optical information reproducing apparatus for reading information signals recorded on a recording medium comprising:

a light source for generating a reading light beam, focusing means for focusing said reading light beam onto said recording medium, light receiving means for receiving harmonic frequencies of said reading light beam emitted from said recording medium having irradiated by said reading light beam wherein said harmonic frequencies have a frequency n (where n is an integer greater than 1) times the frequency of said reading light beam, and a reproducing unit for reproducing said information signals from output signals of the light receiving means.

13. A reflection type recording medium having information signals recorded thereon, comprising:

a reflective layer for reflecting an incident light beam thereon, said reflective layer generating harmonics by the incident light beam, said harmonics having n (n is an integer greater than 1) times frequency as high as a basic frequency of the incident light beam.

* * * * *